United States Patent Office 3,027,097
Patented Mar. 27, 1962

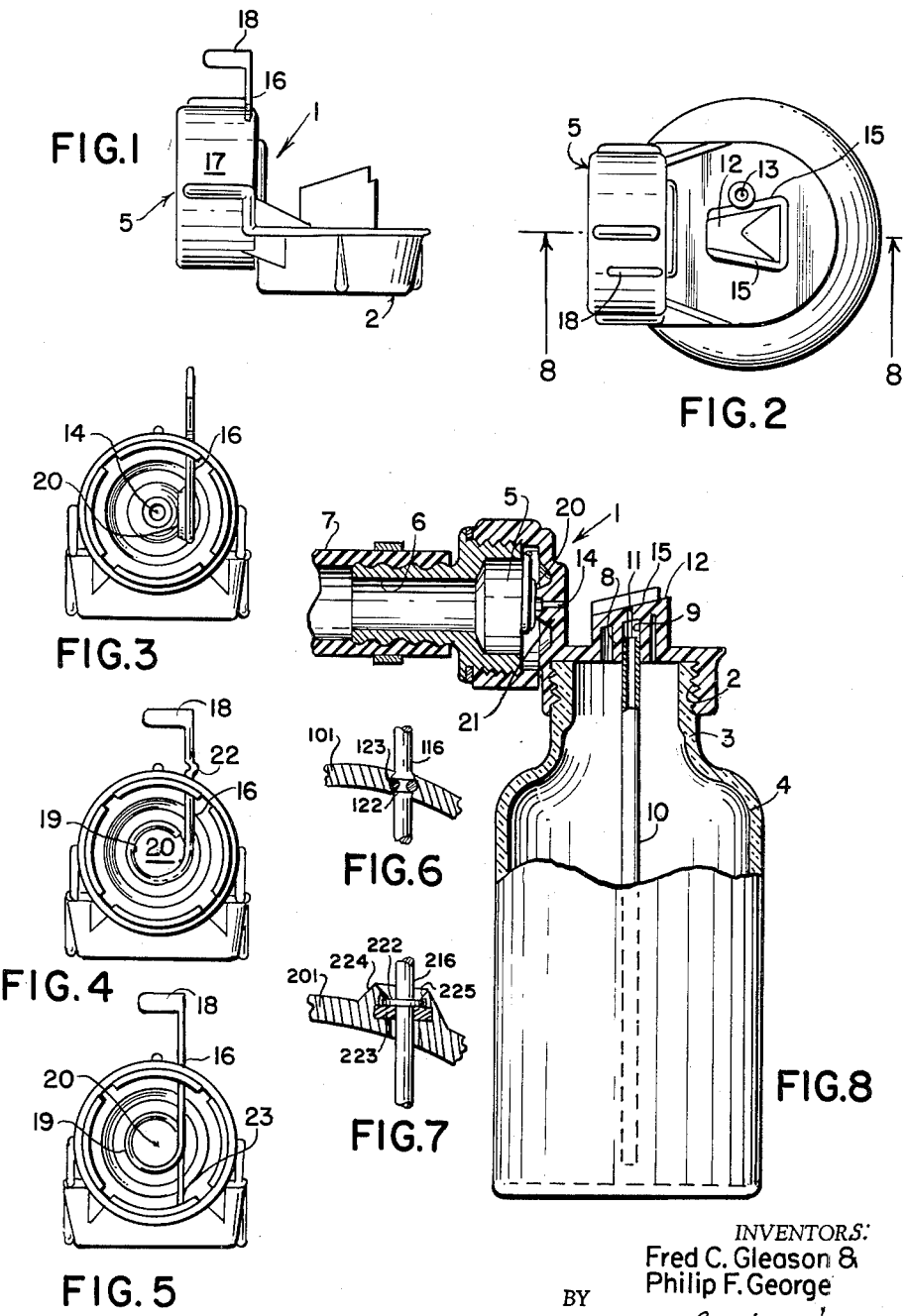

3,027,097
HOSE SPRAY APPLICATOR WITH SHUTOFF
Fred C. Gleason, Cannondale, Conn., and Philip F. George, San Diego, Calif., assignors to American Home Products Corporation, New York, N.Y., a corporation of Delaware
Filed Mar. 20, 1961, Ser. No. 96,849
2 Claims. (Cl. 239—318)

This invention relates to a hose spray applicator with a shutoff. More particularly it relates to such an applicator incorporating a novel shutoff valve comprising a stem rotatably mounted on and passing through the housing of the applicator, having a manual operating means outside the housing and a fixedly mounted disc inside the housing, the stem being located off-center with respect to the axis of flow from the hose, whereby rotation of the stem will bring the disc into or remove it from the line of flow from the hose.

Hose spray applicators have long been known and commonly used for, for example, applying insecticide or the like to garden beds, foliage, lawns, etc. In such use the applicator, provided with a dip tube is usually attached by a bottom threaded opening to the neck of a container containing an insecticide solution, and a water hose is attached to a threaded side opening of the applicator. The applicator is so designed that flow of water from the hose aspirates a desired ratio of liquid insecticide from the container through the dip tube and blends it with the main stream from the hose. Obviously other liquids and solutions other than insecticides can be so distributed, such as fertilizers, growth stimulants, herbicides and the like.

In one form of such applicators, flow of the treating solution is controlled by means of a relief duct connecting the upper end of the dip tube bore with the atmosphere. When this duct is open, no suction is produced in the dip tube; when the outer opening of the duct is closed by, for example, the operator's finger, suction is produced in the dip tube and the treating solution is aspirated and distributed.

This arrangement has the advantages of simplicity, economy and effectiveness in controlling the flow of treating solution, but the great disadvantage of affording no control of the main water stream. Aside from its inconvenience, the continued flow of water may dilute the already applied treating material to such a degree as to make it ineffective.

In another form of applicator, a shutoff valve for the main stream from the hose is provided in the hose line immediately ahead of the applicator. As far as we know, however, hitherto disclosed devices of this sort are complicated, cumbersome and expensive.

Accordingly it is an object of our invention to provide a hose spray applicator incorporating a shutoff valve that is simple, convenient to use and economical to manufacture.

A preferred embodiment of our invention is disclosed in the following description and accompanying drawing, but this disclosure is intended to be illustrative only, and not to limit our invention, the scope of which is defined in the appended claims.

In the drawing:
FIG. 1 is a side view of the applicator;
FIG. 2 is a top view;
FIG. 3 is an end view as seen from the left of FIG. 1 with shutoff valve open;
FIG. 4 is the same view as FIG. 3, but with shutoff valve closed;
FIG. 5 is a view of a modified form of shutoff valve;
FIGS. 6 and 7 are sectional views of alternative forms of shutoff valve mounting in the applicator; and FIG. 8 is a longitudinal sectional view of line 8 of FIG. 2 of the applicator and dip tube mounted on a container, with the shutoff valve in closed position.

In the drawing the body 1 of the applicator, preferably molded of a suitable plastic such as polyethylene, nylon, rubber or the like, is provided with a threaded bottom opening 2 for attachment to the threaded neck 3 of a container 4, and with a threaded side opening 5 for connection with a nipple 6 of a water hose 7. On the under side of body 1 is a boss 8 with a central bore 9 adapted to receive friction-tight a dip tube 10 reaching to near the bottom of container 4. A minute orifice 11 connects bore 9 with the atmosphere through inclined table 12. A relief orifice 13 affords communication between the upper part of container 4 and the atmosphere.

A third orifice 14 affords communication between opening 5 and the atmosphere. It is so oriented as to direct a high velocity stream of water from hose 7, when the latter is connected with a pressure source of water, along inclined table 12 and across the mouth of orifice 11. This action aspirates the contents of container 4, the contents being blended with the water stream in a desired ratio. Low ridges 15 along the edge of table 12, aid in confining and directing the water stream.

The ratio of treating liquid (insecticide or the like) to the water stream is determined chiefly by the water pressure and the ratio of diameters of orifice 11 and orifice 14, the diameter of orifice 11 being in general substantially less than that of orifice 14.

In order that the user may control the delivery of treating liquid from the present device, a shutoff valve is provided in opening 5. This shutoff valve comprises a stem 16 rotatably mounted in the wall 17 of opening 5 through a hole perpendicular to but offset from the axis of opening 5 as shown in FIGS. 1–4. The part of the stem outside opening 5 is bent into a right-angle finger piece 18 and the end within opening 5 is bent into a loop 19 while mounting the valve in position. A circular elastic washer 20 of rubber, neoprene or the like is then cemented to this ring. A kink 22 may be formed in stem 18 to prevent washer 20 from being forced out of line. Alternatively the same result may be secured by extending the loop 19 to form a footing as shown at 23 in FIG. 5.

Alternative methods of providing a water-tight mounting for the shutoff valve are illustrated in FIGS. 6 and 7.

In the form shown in FIG. 6, valve stem 116, at the point where it passes through applicator housing 101 is provided with a circumferential groove 122 mating with a small elastic O-ring gasket 123. The hole in housing 101, through which stem 116 passes, is molded with an internal groove to accommodate the O-ring. In assembly, the elasticity of the O-ring and the slight give in the plastic housing 101 permit the stem 116 and O-ring 123 to be forced into the position shown, providing a water-tight seal while permitting rotation of stem 116.

In the form shown in FIG. 7, an annular gasket 223 of rectangular cross section is used instead of an O-ring. Housing 201 is molded with a tapered circular rim 224 surrounding the hole through which stem 216 passes, and an internal circular recess is provided to accommodate gasket 223 as shown. A washer 222 is advantageously fixed attached to stem 216 to seat on gasket 223 and be retained under lip 225 molded in rim 224. This arrangement also provides a water-tight seal while permitting rotation of stem 216.

In FIGS. 1–7 analogous parts are identified by index numbers having the same digits in the units and tens places.

Orifice 14 opens into opening 5 through a frustoconical boss 21 which forms a suitable seat for washer 20 when the valve is in closed position (see FIG. 8).

The stem of the valve is advantageously made of semihard brass or cadmium-coated steel or similar wire sufficiently soft to permit bending but sufficiently stiff to hold its shape when bent. The hole through which the stem passes may conveniently be made by drilling through the plastic housing with a piece of the stem wire itself. This has been found to make a leak-proof opening for the stem, FIGS. 1–5.

From this description it will be seen that when the valve stem is turned by manipulating finger piece 18 so that washer 20 lies parallel to the axis of opening 5 as shown in FIG. 3, water from hose 7 has an unrestricted flow to and through orifice 14. With a suitable head of water, the stream will flow at high velocity across the mouth of orifice 11 and aspirate treating fluid (insecticide or the like) from container 4. If, however, the valve stem is turned so that washer 20 seats on boss 21 (FIGS. 4 and 8), the flow of water is shut off and aspiration stops; the pressure of water on disc 20 forces it against boss 21 and thus maintains a tight seal.

It is clear from this disclosure that the present device affords an exceedingly simple and economical means of controlling the application of treating solutions aspirated by means of a water stream.

We claim:

1. In a hose applicator adapted to aspirate and distribute treating liquid from a container by means of a high-velocity stream of water, the said applicator comprising a housing provided with a bottom opening adapted to be connected with the neck of a container for the treating liquid, and being provided with a dip tube adapted to extend to a point near the bottom of the container and to communicate with the atmosphere through a first orifice in the applicator housing, said housing also being provided with a side opening adapted to be connected with a source of water under pressure and a second orifice in said housing communicating with said side opening and so oriented as to direct a stream of water across said first orifice, the improvement that comprises: a housing of semi-rigid plastic, a shutoff valve comprising a wire stem rotatably mounted on and passing through the wall of the housing of the applicator, the protruding end of the stem being bent at an angle to the stem to form a manual means outside the housing for rotating the stem, the end of the stem within the housing being bent into a circular loop, and a disc inside the housing cemented to said loop, the stem being located off-center with respect to the axis of flow of the water under pressure, whereby rotation of the stem will bring the disc into or remove it from the line of flow of said water and thus control said flow.

2. A hose spray applicator as defined in claim 1 in which said second orifice communicates with said side opening through a frustoconical boss forming a seat for said disc when in a position across the water flow.

References Cited in the file of this patent

UNITED STATES PATENTS

| | | |
|---|---|---|
| 496,045 | Dinsmore | Apr. 25, 1893 |
| 1,442,654 | Douglass | Jan. 16, 1923 |
| 1,636,461 | Colburn | July 19, 1927 |
| 2,030,853 | Budwig | Feb. 18, 1936 |
| 2,260,603 | Budwig | Oct. 28, 1941 |
| 2,809,800 | Ahl | Oct. 15, 1957 |
| 2,940,673 | Budwig | June 14, 1960 |